United States Patent Office 3,151,106
Patented Sept. 29, 1964

3,151,106
PYRIDINIUM AZO DYES AND PROCESS FOR THEIR PRODUCTION
Sien Moo Tsang, Middlesex, and Charles E. Lewis, Somerville, N.J., assignors to American Cyanamid Company, New York, N.Y., a corporation of Maine
No Drawing. Application Mar. 7, 1958, Ser. No. 719,744, which is a division of application Ser. No. 643,231, Mar. 1, 1957, now Patent No. 2,893,816, dated July 7, 1959. Divided and this application Sept. 30, 1958, Ser. No. 764,239
3 Claims. (Cl. 260—156)

This invention relates to new dyes for coloring polyacrylonitrile fibers, and to a new process for preparing such dyes.

More specifically, it relates to quaternary ammonium azo dyes, for coloring polyacrylonitrile fibers containing a major proportion of acrylonitrile, which have the structure:

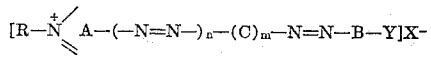

in which

is an aromatic monoazine ring system of less than three six-membered rings in which the quaternized nitrogen is the azine nitrogen, R is an organic radical, C is an arylene radical of less than three six-membered carbocyclic rings in which the two links to the rest of the molecule are conjugated to one another, $n$ is zero or one, $m$ is zero or one but when $n$ is one $m$ must be one, B is an aromatic radical of less than three rings, Y is an unionized substituent whose bond to an aromatic ring has a dipole moment greater than 1.00 Debye units with the negative end of said dipole at the ring, such substituent Y being conjugated through the other parts of the molecule with the said quaternized monoazine nitrogen, and $X^-$ is an anion.

More specifically also, it relates to a process of condensing 2-aminopyridines with para-nitrosodimethylaniline which comprises heating said compounds in a non-polar solvent in the presence of potassium hydroxide and azeotropically distilling off the water formed.

The polyacrylonitrile fibers, which have become increasingly useful articles of commerce, are difficult to dye. Most of the commercially available fibers of this type contain a major proportion of polyacrylonitrile. In most cases over 85% of the fiber is acrylonitrile. Few of the standard dyestuffs available show affinity for these fibers of high acrylonitrile content polymers. Especially, it has been hard to obtain deep shades on these fibers, since deep shades require a strong affinity of the fiber for the dyestuff. The only way to achieve deep shades has been to increase the time and temperature of the dyeing process. Such drastic conditions of dyeing result in injury to the fabrics. The resistant properties of these fibers are desirable for general textile use because they render the fiber physically durable. However, the problem of dyeing has been so great that these durable types may have to be superseded by more dyeable types which are less durable physically unless methods of dyeing them readily are found. In some fibers, there has been incorporated a basic comonomer for the main purpose of making them dyeable with acid dyes.

The dyes which have been on the market for acrylic fibers not containing basic comonomers are not azo dyes but primarily are dyes of the styryl or polymethine or anthraquinone class. In general, in the past, it has not been believed possible for azo dyes to have good fastness properties on acrylic fibers of this type, and it is most surprising to find a class of dyes which does have such fastness. It is further surprising that the azo dyes have sufficient light fastness to be of value, since azo dyes in general have poor light fastness unless converted into metallic complexes. It is further surprising that amino azo dyes should have pH stability, since such dyes are known to undergo a shade change with pH.

We have found that azo derivatives of quaternized heterocyclic ring systems having an electron donating or releasing group in conjugation through the azo group with the quaternized nitrogen have an exceptional affinity for acrylic fibers, especially those containing no basic comonomers. The affinity of these dyes is so strong that very heavy shades may be obtained, ranging from yellow to red, bordeaux, maroon, red-brown, brown, violet and blue shades. At the same time, we have found that these dyes can be used to give very pleasing light shades and that the shades obtained from these dyes have excellent light fastness with little or no sensitivity to change of pH. Specifically, we have found that dyes of this class having for the quaternized heterocyclic ring system a pyridine or its homologs and benzo derivatives, or a 2-arylbenzothiazole in which the azo group is in an ortho or para position of the aryl ring, are new dyes of exceptional properties. We have further found an unusual synthetic process for the synthesis of these compounds.

One type of dye of our invention has the general formula:

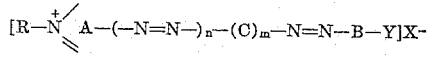

in which

represents a pyridinium or quinolinium ring system, C represents a phenylene, naphthylene, or biphenylene radical, $n$ is zero or one as is $m$ but $m$ must be one when $n$ is one, B is an arylcarbocyclic radical of one or two rings, Y is the electron donating group, $X^-$ is the anion. The detailed equivalents of each of these symbols are discussed below, but in general, the electron donating group Y must be in conjugation through B with the azo group and through A with the quaternary nitrogen.

The polyacrylonitriles which are dyed by the compounds of our invention are those polymers and copolymers of acrylonitrile which contain a major proportion by weight of acrylonitrile. They may also contain basic comonomers, such as methylvinylpyridine and vinylpyridine, or comonomers such as methyl acrylate, vinyl acetate and vinyl chloride. Of the polyacrylonitriles available commercially which can be used to form the colored polyacrylonitriles of our invention, one is 100% polyacrylonitrile, another is approximately 95% acrylonitrile and approximately 5% methyl acrylate, another has 89% of acrylonitrile, 6% methylvinylpyridine, and 5% vinyl acetate, and still another has a composition of 94% acrylonitrile, 5% methylvinylpyridine, and 1% vinyl acetate. Polymers having as litle as 50% acrylonitrile can be dyed by this class of dyes to form our invention. However, those lacking the basic comonomer not only present a more serious problem in dyeability when using previously available dyes but also, and surprisingly, are dyed better and stronger by these cationic dyes.

The dyestuffs to be used in our invention are represented by the above formulae. A is the remainder of a monazine ring system in which the quaternized nitrogen is conjugated with the azo bridge. The monazine ring systems include the pyridines and the benzopyridines such as the quinolines. The azo bridge must be attached to the aromatic ring system in such a way that it is in conjugation with the quaternized nitrogen, that is, that it is separated from the quaternized nitrogen by an odd number of unsaturated atoms. All aryl groups must be linked into a continuous conjugated chain between the azo bridge and the quaternized nitrogen. Thus, A can be e.g., a pyridylbenzene (direct diaryl bonding) or a pyridylazobenzene (linking through a second azo bridge). Other examples of such complex aromatic systems are listed above.

The aryl group on the other side of the azo bridge, for which the symbol B is used in the general formula, is a carbocyclic aromatic radical of less than three rings, such as the benzene, biphenyl or naphthalene ring systems. The substituent Y on this aryl group B is an electron releasing group. It must be substituted on B in such a way that it too is in conjugation with the azo group, that is, Y is separated from the carbon to which the azo bridge is linked by an odd number of carbon atoms. Electron releasing substituents in an aromatic ring are those having a dipole whose negative end is toward the ring. It is necessary that this substituent be of this nature in order to get adequate substantivity.

However, this electron releasing property must be carefully controlled since the net charge on the azo dye must remain positive. The electron releasing mechanism must be such that it will not diminish too much the charge on the quaternized nitrogen. As a result the group Y may not be an ionized substituent. Consequently, such forms as phenolic salts may not be present as Y. Especially is this true of the phenolic salts, since when such are present in the same molecule as the quaternized nitrogen, there is a tendency for the zwitterion to mesomerize into a neutral molecule with a quinoid structure and such a mesomeric form is deficient in many properties when applied to polyacrylonitrile fibers. Hydroxyl can be present but must be applied only from an acid bath. Similarly, the electron releasing power must not be too small, else the substantivity of the dyestuff is reduced, since the electron releasing power is connected with the dipole of the bond joining the group to the aromatic group. Consequently, Y cannot be a phenolic salt or a substituent with a low dipole such as alkyl or one with a reverse dipole such as a halogen. It is preferable to state the electron releasing power in terms of this dipole. The dipoles of some of the common substituents of this nature are as follows:

—N(CH$_3$)$_2$ ---------------------------------- 1.58
—NH$_2$ ---------------------------------------- 1.52
—OH ------------------------------------------ 1.61
—OCOCH$_3$ ------------------------------------ 1.52
—OCH$_3$ -------------------------------------- 1.16
—CH$_3$ --------------------------------------- 0.41
—H ------------------------------------------- 0

The operable substituent Y includes those in this column and their homologues and similar derivatives except for the alkyl and the unsubstituted aryl (i.e., Y is H) at the bottom of the list. Consequently, it is necessary in order to define the operable groups to specify that they should be an unionized substituent whose bond to the ring has a dipole moment greater than 1.00 Debye units with the negative end of said dipole at the ring.

The quaternizing group R may be any organic radical. R may be an alkyl such as methyl, ethyl, propyl, butyl, lauryl, cetyl, octadecyl, and the like. It may be an alkenyl group such as allyl or crotyl, or an aralkyl such as benzyl or substituted benzyl or it may be a cycloalkyl group such as cyclohexyl and the like.

The anion X$^-$ may be any suitable anion of an acid, such as the bromide, iodide, chloride, sulfate, phosphate, nitrate, acetate, methosulfate, ethosulfate, and the like. In general, the anions of the strong mineral acids such as the halides, the sulfates, the nitrates and the phosphates, or the anions of organic sulfonic acids such as the benzenesulfonate and the like are preferred but the anions of organic acids such as the organic carboxylic acids will be equally well usable. In general, the anion should be one giving water-soluble salts with quaternary bases, in order to give the most usable dyestuffs.

In the general dyestuffs of our invention, groups A and B may be further substituted but the substituents must be so chosen that the net charge on the dye molecule remains positive. Substituents such as alkyl, nitro, alkoxy and halogeno groups are usually suitable. Examples of such dyestuffs containing substituents elsewhere in the molecule are as follows:

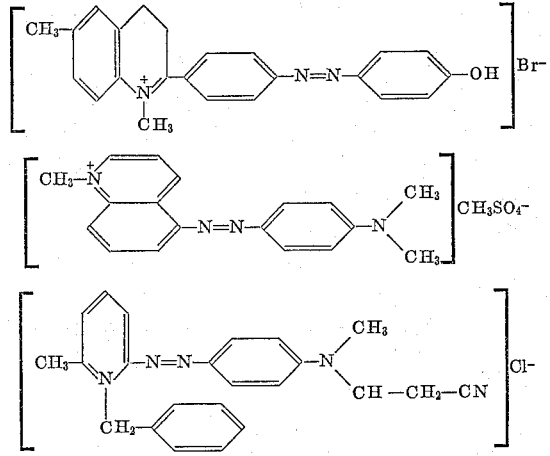

In some cases the azo group is attached directly to the ring having the quaternized nitrogen. In other cases it is in another ring or separated by an arylene group. However, in all cases it must be in a position conjugated with the quaternized nitrogen.

The class of dyes of our invention includes the dyes in which A is the residue of a pyridine, substituted pyridine or benzopyridine, defined collectively as a monoazine; that is, an aromatic ring system of one or two rings having one six membered heterocyclic aromatic ring comprising five carbons and one nitrogen. Of these an especially preferred species are the cationic pyridinium dyes of the formula:

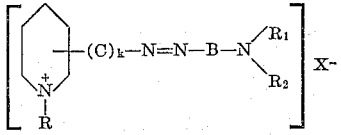

where the group C is attached to the pyridinium nucleus in the 2 or 4 position (that is, in conjugation with the quaternary nitrogen), $k$ is 0 or 1 (i.e., the azo bridge is either bonded directly to the pyridine ring or through C), C is an azophenylene group in which the azo group is conjugated through the phenylene with the azo bridge in the formula, B is an arylene radical of the benzene or naphthalene series, the amino nitrogen being attached to a position conjugated with the azo group, as described above (that is, ortho or para in the same ring and where the group B is, e.g., naphthalene, also in the 5 or 7 positions in the other ring), R is an alkyl, substituted alkyl, cycloalkyl, aryl, aralkyl or alkenyl group as described above, and X is the anion of an acid such as the iodide, bromide, chloride, methosulfate, ethosulfate, or phosphate as described above, R$_1$ and R$_2$ may be hydrogen, alkyl groups such as methyl, ethyl, lauryl, cetyl, or octadecyl, acyl such as acetyl and benzoyl, alkenyl such as allyl and butenyl, or substituted alkyl such as cyanoethyl and cyclic alkyl such as cyclohexyl or R$_1$ and R$_2$ together with the nitrogen may be part of a heterocyclic ring such as a morpholine, piperidine, pyrrolidine, pyrrolidone, and the like. The dye molecule may be further substituted provided the net charge of the dye molecule remains positive. The azo group must be in the 2 or 4 position obviously in order to be conjugated with the quaternary nitrogen. If the azo group is in a meta position (i.e., 3 or 5) of the pyridine nucleus, a definite loss in affinity for acrylic fibers and poor light fastness is obtained.

The 2-arylazo pyridinium dyes generally demonstrate the greater pH stability of shade. Dyes such as

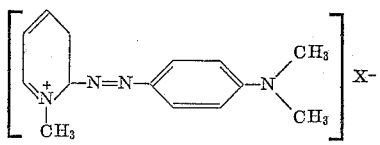

or its 6-methyl pyridinium analog, or analogous higher alkyl analogs or substituted alkyl analogs such as beta-cyanoethyl, especially when such substituents are on the amino group, are dyes of exceptional affinity, fastness to light, and resistance to changes of shade with pH. The anion $X^-$ is not critical, but may be any halide, sulfate, phosphate, etc. However, the 4-azo type in which the azo bridge is para to the quaternized nitrogen in the pyridinium ring also have very strong affinity for acrylic fibers and in some cases are just as stable to pH. For example, the dyestuff

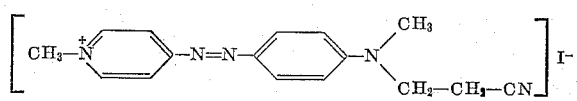

is a bright bordeaux quite stable to change in pH.

While these pyridinium dyes have been described in terms of pyridine and its homologs and substituted form, the new dyestuffs of our invention encompass also the benzopyridines such as the quinolines and, thus, in its broader aspects, our new dyes comprise azo dyes of this type derived from any such quaternized monazine.

METHODS OF PREPARATION

The dyestuffs to be used in our invention can be prepared by a number of various methods, some of which are more applicable to some dyes than to others. In the following discussion of these various preparations, the schematic formulae use the same general symbols as are used for the general formula of dyestuff above.

(1) *Coupling followed by quaternization.*—The diazo derivatives of a heterocyclic amine can be coupled with the proper coupling agent and the resulting azo dye quaternized as illustrated by the following schematic formula:

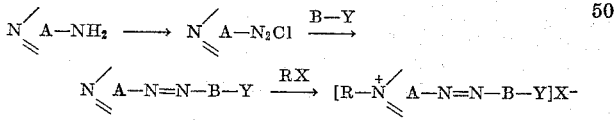

(Conversely, the diazotizable heterocyclic amine can be first quaternized and then diazotized and coupled.) Suitable starting materials for the formation of azo dyes by this method of preparation are the following amines, as diazo components:
4-aminopyridine
4-amino-2 or 3-methylpyridine
4-amino-2,6-dichlorpyridine
4-(p-aminophenyl)-pyridine
2-(p-aminophenyl)-pyridine
2-(4-amino-1-naphthyl)-pyridine
4-, 5-, or 7-aminoquinoline
5-amino-6,7-dimethoxyquinoline
4-amino-2,3-dimethylquinoline
4-amino-2-ethoxyquinoline
5-amino-6-methylquinoline
4-amino-7-chloroquinoline
7-amino-2-phenylquinoline
4-amino-2-methylquinoline
2-(p-aminophenyl)-quinoline
8-aminoisoquinoline These may be coupled to
aniline
N,N-dimethylaniline
3-methyl-N,N-dimethylaniline
3-ethoxy-N,N-diethylaniline
2,6-diethylaniline
1,5-diaminonaphthalene
2,6-diaminopyridine
N-methyl-N-β-cyanoethylaniline
N,N-bis(β-cyanoethyl)aniline
3-methoxy-N-methyl-N-β-cyanoethylaniline
N,N-diethylaniline
α or β-naphthylamine
N-methyldiphenylamine
N-methyl-α-naphthylamine
2,5-dimethoxyaniline
N,N-bis-(β-hydroxyethyl)aniline
2,4-diaminotoluene
2-methylimidazopyridine
2-methylpyrrocoline
2-phenylpyrrocoline
1-methyl-2-phenylindole
1,2,4-trimethyl-3-carbethoxypyrrole
2,4-diamino-6-hydroxypyrimidine (2) *Condensation of an amine with a nitroso compound.*—Another method of preparation of the dyestuffs of our invention, which is especially useful for the 2-azopyridinium dyestuffs of our invention, is the condensation of a 2- or 4-aminopyridine with a nitroso compound followed by quaternization of the resultant azo dye. This preparation can be illustrated by the following equation using 2-aminopyridine and paranitroso dimethylaniline as the illustrative reactants.

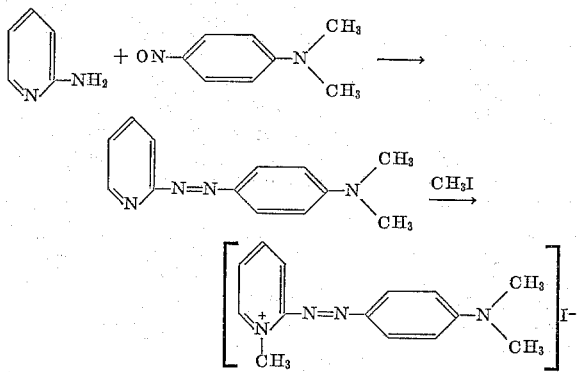

Some amines which can be used in this method of preparation are:

2- or 4-aminopyridine
2-amino, 3-, 4-, 5-, or 6-methylpyridine
4-amino- 2- or 3-methylpyridine
2- or 4-amino-3-ethyl-6-methylpyridine
2-amino-4-ethylpyridine
4-amino-2-ethylpyridine
2-amino-5-chloropyridine
2-amino-3,5-dichloropyridine
2-amino-5-ethoxypyridine
2- or 4-aminoquinoline
2-amino-8-ethoxyquinoline
2-amino-4,5,6,7 or 8-methylquinoline
1-aminoisoquinoline
1-amino-3-methylisoquinoline These amines can be condensed with any one of the following:

4-nitroso-N,N-dimethylaniline
4-nitroso-3-methyl-N,N-dimethylaniline
4-nitroso-3-ethoxy-N,N-diethylaniline 4-nitroso-N,N-diethylaniline
4-nitroso-N-methyl-N-β-cyanoethylaniline
4-nitroso-3-methoxy-N-methyl-N-β-cyanoethylaniline
3-nitroso-2-methylimidazopyridine
3-nitroso-2-methylpyrrocoline
3-nitroso-1-methyl-2-phenylindole
4-nitroso-N-methyl-N-phenylaniline This method is especially important because such compounds as 2-aminopyridine cannot be diazotized and coupled. Consequently, this or another alternative preparation to be described later must be used.

An improvement in this process is moreover a part of our invention. The condensation of 2-aminopyridine with a nitroso compound has previously been carried out by forming a metal salt either by the use of a reagent such as sodium metal or with such agents as sodium methylate, sodium ethylate or sodamide. Because of the weakly acidic character of 2-aminopyridine, it was not believed possible that an alkali metal hydroxide would be a sufficiently strong base to convert sufficient quantities of 2-aminopyridine to the metallic salt to make further condensation practical. Indeed it is reported in the literature that this reaction would not go with powdered sodium hydroxide.

We have found, however, that when the reaction is carried out in an inert non-polar solvent with potassium hydroxide ranging in quantities from catalytic amounts to an excess, and the water is azeotropically distilled from the mixture as formed, one can get a surprisingly good yield of the corresponding azo body from the condensation of a 2-aminopyridine with a nitroso compound. The distillation of the water helps to complete the reaction and to increase the yield. It is preferred that an equimolecular amount of 2-aminopyridine and potassium hydroxide and a 30% excess of the nitroso compound be used. An excess of potassium hydroxide appears to increase formation of the symmetrical azoxy by-product derived from the self-condensation of the nitroso compound. Although this azoxy compound is readily separated in weakly acidic aqueous media in which the new dyes of this invention have good solubility, the formation of this by-product decreases the yield. The reaction proceeds with catalytic amounts of potassium hydroxide as low as 3–6% of the theoretical amount, but is slower than when an approximately equimolecular proportion is used. It is preferable to use a non-polar solvent such as xylene, toluene, benzene and the like and to maintain anaerobic conditions by covering the reaction mixture with an inert atmosphere such as nitrogen. Polar solvents result in low yields or even no yields at all. The anaerobic conditions are preferred because of the sensitivity of the potassium salt of 2-aminopyridine.

This improved process has a number of advantages over the process of the prior art. Potassium hydroxide is less expensive, easier to store and handle and less hazardous than the reagents such as metallic sodium, sodamide, sodium methylate and the like, and in addition the reaction does not require special apparatus. Furthermore, potassium hydroxide does not react with non-polar solvents as do such reagents as metallic sodium, thus permitting a wider range of solvents to be used.

This method of preparing the azo compounds of our invention is used as an alternative where diazotization and coupling are not readily effected. When diazotization and coupling are possible, that preparation is to be preferred.

(3) *Condensation of a halopyridine with a substituted phenylhydrazine.*—Another alternative preparation for those azo compounds not readily derivable by a diazotization and coupling procedure, is to condense a halo compound with an aryl hydrazine properly substituted, and to oxidize the resulting diaryl hydrazine to the azo body. This procedure can be illustrated by the following equation using 2-bromopyridine and para-nitro-phenylhydrazine as the reactants.

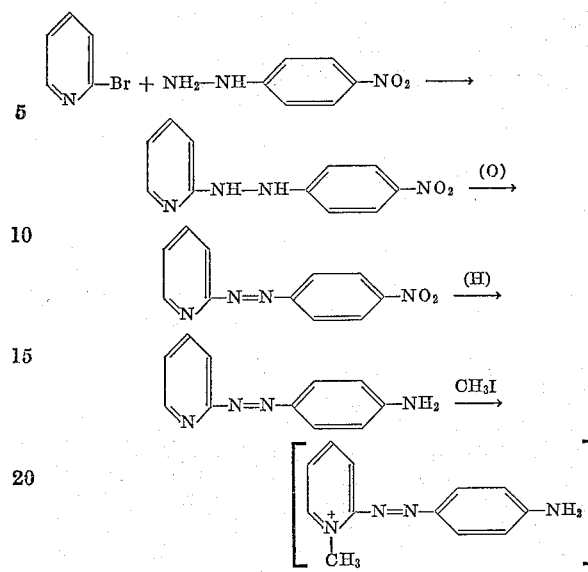

Reactions such as the first step have been carried out in the past in an ethanolic solution at high pressures and temperatures. This reaction is carried out using an excess of the 2-halopyridine at moderate temperatures without the need of pressure equipment.

The substituted pyridyl aryl hydrazines which are the intermediates in this process are claimed in the copending divisional application, Serial No. 719,745, filed March 7, 1958. They may be represented by the formula:

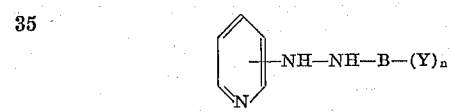

in which B is a carbocyclic aromatic group of less than three six-membered rings, Y is either as defined above or a group capable of being transformed into such a group, such as nitro, and $n$ is a positive integer less than three, and the pyridyl nitrogen is conjugated with the nearest hydrazine nitrogen. Examples of such compounds are $N_1$-4-nitrophenyl-$N_2$-2-pyridyl hydrazine, $N_1$-2,4-dinitrophenyl-$N_2$-2-pyridyl hydrazine, $N_1$-4-methoxyphenyl-$N_2$-2-pyridyl hydrazine, $N_1$-4-acetamino-1-naphthyl-$N_2$-2-pyridyl hydrazine, $N_1$-4-nitrophenyl-$N_2$-4-pyridyl hydrazine, $N_1$-2,4-dinitrophenyl-$N_2$-4-pyridyl hydrazine, $N_1$-4-methoxyphenyl-$N_2$-4-pyridyl hydrazine, $N_1$-4'-acetoxy-4-biphenyl-$N_2$-2-pyridyl hydrazine and the like. Such compounds, new to the art, are not only useful in preparing the new dyes of our invention but as intermediates for antioxidants, intermediates for pyrrazolidiones and for other products.

It is an advantage of our invention that polyacrylonitrile fibers can be dyed with a wide range of shades which show a remarkable stability over a very wide range of pH from basic to strongly acid. The shades obtained differ markedly from those heretofore available for polyacrylonitriles. The dyed fibers show superior fastness to light, carbonizing, dry and wet pressing and washing, as well as to alkaline perspiration. It is a further advantage of our invention that the dyestuffs are readily soluble in water, and dye polyacrylonitrile fibers well at 200° F. in 1% shades with good exhaust. It is a still further advantage of our invention that when dyed from neutral, acetic acid or sodium acetate baths the same dye gives the same shade, unless the phenolic hydroxyl is present, in which case the alkaline bath must be avoided. Furthermore, the fibers dyed with the compounds of our invention show good strength and levelness.

This application is a division of our copending application Serial No. 719,744 filed March 7, 1958, now abandoned, which in turn is a division of our co-pending application Serial No. 643,231 filed March 1, 1957, now U.S. Patent No. 2,893,816.

Our invention can be further illustrated by the following examples in which parts are by weight unless otherwise specified.

Example 1

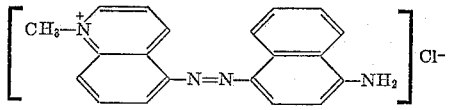

2.1 parts of the methiodide of 5-nitroquinoline is dissolved in 50 parts of water and added to freshly precipitated silver chloride in 10 parts by volume of 20% hydrochloric acid solution. After clarification, the solution is reduced in the presence of 0.4 part of palladium catalyst and hydrogen. After clarification, the filtrate containing the 1-methyl-5-aminoquinolinium chloride is cooled to 2° C. and diazotized with 3.8 parts by volume of 1 N sodium nitrite solution.

A solution of 0.72 part 1-naphthylamine in a mixture of 50 parts water and 4 parts by volume of 5 N hydrochloric acid solution is neutralized to Congo red indicator paper by the addition of 20% sodium acetate solution. The solution of diazo is then added and the coupling mixture adjusted by the addition of sodium acetate to a weakly acid solution negative to Congo red indicator paper. The dye is isolated by filtration and washed with water. It is then slurried in 150 parts water at 80° C., made acid to Congo red indicator paper. The solution of the dye is then salted to precipitate the dyestuff which is isolated by filtration and dried.

When dyed on polyacrylonitrile fibers comprising 94% polyacrylonitrile and 6% methyl acrylate from neutral bath, a violet shade fast to light is obtained.

Example 2

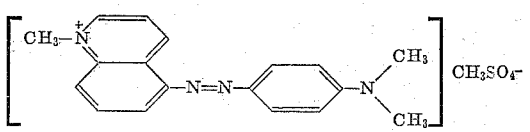

27.0 parts of 1-methyl-5-aminoquinolinium methyl sulfate are dissolved in 200 parts of water containing 19.6 parts of sulfuric acid and cooled to −2° C. 6.9 parts sodium nitrite dissolved in 100 parts of water is added at once and stirred until diazotization is complete.

9.4 parts dimethylaniline are dissolved in 100 parts water containing 10 parts of sulfuric acid. The diazo solution is added and then 20% sodium acetate solution is added to remove the mineral acidity. A temperature of 10–15° C. is maintained by the addition of ice as necessary. After the mixture is stirred until the coupling is complete, 180 parts of sodium sulfate are added and the dye which precipitates is filtered and dried. The dye may be purified by recrystallizing from 5% sodium sulfate solution.

When dyed by Method A, B, C, or D of Example 5, a deep maroon shade is obtained on polyacrylonitrile fibers containing 96% acrylonitrile and 6% methyl acrylate.

Example 3

If in Example 2, the chloride is used instead of the methyl sulfate of the diazo component and other coupling components are substituted for dimethylaniline, new quaternary ammonium azo dyes for acrylic fibers are obtained as follows:

Coupling component used: | Shade
--- | ---
Phenol | Olive.
2,5-dimethyoxyaniline | Deep violet.
2,4-diaminotoluene | Violet.
2,4-diamino-6-hydroxypyrimidine | Orange.

Example 4

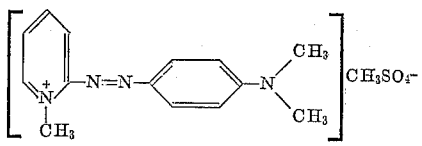

To 50 parts by volume of xylene and 3.2 parts of finely ground 87% potassium hydroxide in an atmosphere of nitrogen, or other suitable inert anaerobic conditions, is added 4.7 parts of 2-aminopyrimidine in 50 parts by volume of hot xylene. The mixture is heated at reflux and all water formed during the reaction is azeotropically distilled off. Then 10 parts of p-nitrosodimethylaniline in 100 parts by volume of hot xylene is added gradually at reflux. Refluxing is continued until the condensation is complete. The reaction mixture is allowed to cool sufficiently to clarify by filtration. The xylene filtrate is then extracted with 5% hydrochloric acid, which is made up to 450 parts by volume. About 50 parts by volume of 20% sodium hydroxide solution is then added with stirring until the extract has become weakly acid. The by-product, p,p'-bis-dimethylaminoazoxybenzene, is removed by filtration. The filtrate containing the desired product is then adjusted by means of 20% sodium hydroxide solution to a pH of approximately 8 to precipitate the product. After stirring about ½ hour, the product is isolated by filtration, washed with water and dried.

The dye is then quaternized by dissolving in 250 parts by volume of dry toluene, adding 3.0 parts by volume of dimethyl sulfate and refluxing about four hours. The cationic pyridinium dye which precipitates during this time is isolated by filtration, washed with toluene and dried.

When dyed on acrylic fibers using the methods of Example 9, violet shades of good fastness to light, crocking, and perspiration are obtained.

If in the above process, instead of 3.2 parts of 87% KOH, quantities such as 1.9 parts, 0.85 part or 6 parts are used, a product identical to the violet dye described above is similarly obtained when dyed on polyacrylonitrile fibers such as fibers of the following compositions:

| No. | Acrylonitrile | Methylacrylate | Vinylacetate | Methylvinylpyridine | Vinylpyridine |
| --- | --- | --- | --- | --- | --- |
| 1 | 100 | | | | |
| 2 | 96 | 4 | | | |
| 3 | 95 | 5 | | | |
| 4 | 94 | 6 | | | |
| 5 | 94 | | 1 | 5 | |
| 6 | 89 | | 5 | | 6 |

Example 5

DYEING OF POLYACRYLONITRILE 0.2% dye on weight of fiber is dissolved in water and diluted to 200 parts. The pH is adjusted as indicated in A, B, C, and D below. Five grams acrylic fibers having a major proportion of acrylonitrile are added. The dye bath is brought to boil in 10–20 minutes and boiling is continued one hour. The fiber is rinsed with cold water and then soaped with 0.1% neutral soap solution, rinsed and dried.

(A) 2% acetic acid, 0.3% sodium acetate.
(B) Neutral; no additives.
(C) 1% sulfuric acid.
(D) 1% soda ash.

All percents are on the weight of the fiber or fabric.

When the product of Example 7 is dyed by Methods A, B, or C above, a deep violet is obtained on Fiber 2 of Example 4.

Example 6

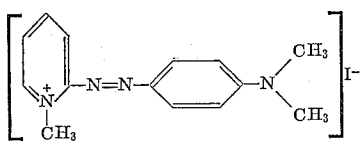

3.4 parts of the azo condensation product of Example 4, 20 parts by volume of methyl alcohol and 0.95 part by volume of methyl iodide are charged in a sealed container and heated at 75° C. until reaction is complete. The product, recrystallized from boiling methyl alcohol and washed with ether, is similar to the methosulfate product of Example 4 in shade and dyeing properties.

A similar product is obtained under conditions of reflux instead of pressure.

A similar product is obtained if 40 parts of azo condensation product prepared as in Example 4, and 10 parts by volume of methyl iodide dissolved in 100 parts by volume of dry benzene are refluxed seven hours.

When dyed on Fiber 2 of Example 4 a deep violet shade is obtained with a standard light fastness rating of 5–6.

Example 7

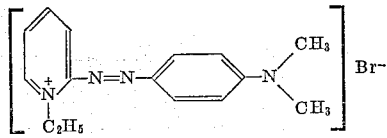

One part of the condensation product of Example 4, 25 parts by volume of benzene and 4 parts of ethyl bromide are refluxed until quaternization is complete. The precipitated quaternary dye is filtered off and washed with ether. When dyed on Fiber 2 of Example 5, it is slightly redder than the quaternized dyestuff of Example 4.

Example 8

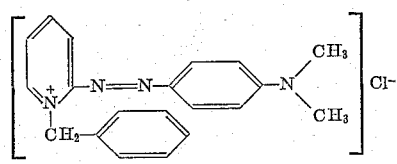

One part of the condensation product of Example 4, 25 parts by volume of benzene and 0.8 part of benzyl chloride are refluxed until the reaction is complete. The quaternized product is filtered, washed with ether and dried. It is a bluer violet than the quaternized dye of Example 4.

Example 9

If in Example 4 or Example 6, in place of 4-nitroso-N,N-dimethylaniline, other nitroso components are used which have electron releasing groups in the ortho or para position, dyes are obtained which have high affinity for polyacrylonitrile fibers when dyed one hour at the boil in neutral to weakly acid dye baths.

| Nitroso Components | Shade | |
|---|---|---|
| | Fiber 2 of Ex. 4 | Fiber 6 of Ex. 4 |
| p-Nitrosoanisole | Yellow | Yellow. |
| 4-nitroso-3-methyl-N,N-dimethylaniline. | Violet | Violet. |
| 4-nitroso-3-ethoxy-N,N-diethylaniline. | Gray-violet | |

Example 10

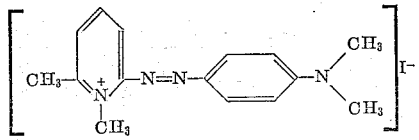

If a condensation of 2-amino-α-picoline is made with nitrosodimethylaniline following the methods of Example 4 and the product is quaternized by the method of Example 6, with methyl iodide, an excellent deep red-violet shade fast to perspiration and light is obtained on Fiber 2 of Example 5.

If instead of 2-amino-α-picoline, the 5-methyl-2-aminopyridine is used, the resultant quaternary ammonium dye, 1,5 - dimethyl - 2-(p-dimethylaminophenylazo)pyridinium iodide, is a much bluer violet.

Example 11

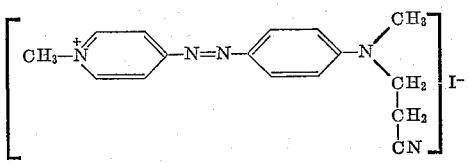

Thirty-five parts of finely ground sodium nitrite are added to 1000 parts of 98% sulfuric acid at 20–45° C. The solution is cooled to 5° C. and 50 parts of 4-aminopyridine dissolved in 250 parts of glacial acetic acid are added gradually with external cooling to hold the temperature below 15° C. The diazo mixture is stirred a short time.

Eighty parts of N-methyl-N-β-cyanoethylaniline are dissolved in 200 parts of glacial acetic acid and added to the diazo at 15–20° C. The reaction mixture is stirred until the reaction is complete, drowned in a large volume of ice and made up to 5000 parts by volume. The pH is adjusted to 7–8 with 20% sodium hydroxide solution. The dyestuff which precipitates is filtered off and dried.

The azo dyestuff thus obtained is quaternized as follows: The dye is dissolved in 1500 parts by volume of benzene. The inorganic salts are removed by filtration. To the filtrate are added 100 parts of methyl iodide and the mixture refluxed until quaternization is complete. The desired azo pyridinium product is then separated by filtering the hot solution and dried.

It dyes polyacrylonitrile fibers a bright Bordeaux when Methods A or B of Example 5 are used. The dyeing has excellent light fastness and wash fastness.

Example 12

Other quaternized 4-(arylazo)-pyridinium dyes similar to those of Example 11 may be made in a manner similar to Example 11, using the same diazo component by varying the coupling component. When dyed in neutral to very weakly acid bath one hour at the boil, the following results are obtained:

| Coupling component: | Shade |
|---|---|
| 2,6-diethylaniline | Deep red. |
| 2-naphthylamine | Bordeaux. |
| N,N-dicyanoethylaniline | Blue-red. |
| 3-ethoxy-N,N-diethylaniline | Violet. |
| N,N-dimethylaniline | Bright violet. |
| 3-methyl-N,N-dimethylaniline | Violet. |
| N,N-dipropylaniline | Do. |
| 2,5-dimethoxyaniline | Bordeaux. |
| 2,5-dimethyl-N,N-diethylaniline | Violet. |
| 2,6-diaminopyridine | Scarlet. |

Example 13

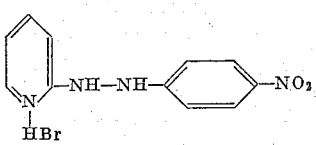

A mixture of 20 parts of para-nitrophenylhydrazine and 63.2 parts by volume of 2-bromopyridine is heated gently until the mixture is homogeneous. The mixture is then heated to the boiling point of 2-bromopyridine for a few minutes, after which it is cooled. The precipitated product is filtered and dried, giving a good yield of 2-para-nitrophenylhydrazinylpyridine hydrobromide.

Instead of para-nitrophenylhydrazine, equivalent parts of the following compounds can be used to give the corresponding hydrazinyl derivatives suitable as intermediates for preparing the dyes of this invention:

2,4-dinitrophenylhydrazine
4-methoxyphenylhydrazine
4-acetamino-1-naphthylhydrazine
p-(N-phenyl-N-methyl)aminophenylhydrazine
p-(N-phenyl)aminophenylhydrazine
p-(N-p'-methoxyphenyl)aminophenylhydrazine Also in the above procedure other 2- or 4-halogenopyridines or p-tolylhydrazine may be used in place of 2-bromopyridine to give new intermediates.

*Example 14*

The hydrohalides of Example 13 may be converted to the corresponding free bases by the following method:

10.05 parts of 2-p-nitrophenylhydrazinylpyridine hydrobromide are suspended in 200 parts of water and treated with a solution of 3.19 parts of sodium bicarbonate in 50 parts of water. The reaction mixture is stirred until neutralization is complete and is then filtered to give the free base.

*Example 15*

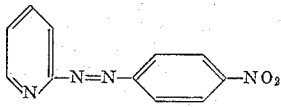

To a stirred suspension of 24.62 parts of 2-p-nitrophenylhydrazinylpyridine hydrobromide in 300 parts by volume of glacial acetic acid heated at gentle reflux is added gradually a solution of 62.4 parts by volume of 1N sodium nitrite in 40 parts of water. The reaction mixture is cooled, diluted with 1000 parts of water and made alkaline by the addition of sodium carbonate. Filtration isolates brown crystals of the product.

*Example 16*

To a stirring and refluxing solution of 6.30 parts of 2-p-nitrophenylhydrazinylpyridine in 50 parts by volume of glacial acetic acid is added gradually a solution of 18.0 parts by volume of 1 N sodium nitrite in 12 parts of water. The reaction mixture is heated at reflux until the reaction is complete; about half of the acetic acid is removed by steam distillation and the resulting mixture diluted with 500 parts of water. Neutralization at 10–15° C. with concentrated ammonium hydroxide isolates brown crystals of the product.

*Example 17*

A mixture of 1.42 parts of 2-p-nitrophenylhydrazinylpyridine hydrobromide and 21 parts by volume of 30% sodium hydroxide solution is heated at the boil for 45 minutes while a stream of air is blown through the mixture. On cooling, the mixture is filtered to give brown crystals.

Other hydrazines prepared as shown in Example 13 may be oxidized by the methods of Examples 15, 16, or 17 to form azo compounds, the nitro group of which may be reduced to an amino group and quaternized by the method of Example 18 to give new cationic dyes which dye polyacrylonitrile fibers red to blue shades.

*Example 18*

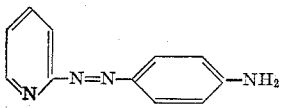

To a refluxing solution of 0.5 part of 2-p-nitrophenylazopyridine in 9.5 parts by volume of ethanol is added a solution of 1.17 parts of sodium sulfide nonahydrate in 8.77 parts of water. The resulting solution is heated at reflux until the reaction is complete. It is then cooled and filtered to give the product as bright orange crystals.

This dye when quaternized by methods described in Examples 4, 6, 7 or 8 gives a cationic dyestuff which dyes polyacrylonitrile fibers bright red shades with excellent fastness properties.

*Example 19*

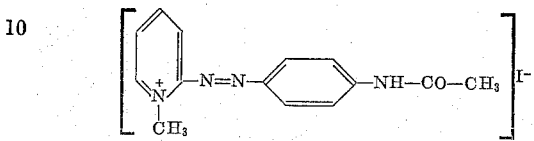

A mixture of 0.3 part of 2-p-aminophenylazo-1-methylpyridinium iodide and 10 parts of acetic anhydride is refluxed until the reaction is complete. It is then cooled, filtered and washed with benzene to give the product as red crystals.

It dyes polyacrylonitrile fibers a bright yellowish orange shade.

If, instead of acetic anhydride, an equivalent amount of p-nitrobenzoyl chloride is used, a cationic dyestuff is obtained which dyes polyacrylonitrile fibers a bright yellowish orange which is slightly yellower than the corresponding acetyl dye.

*Example 20*

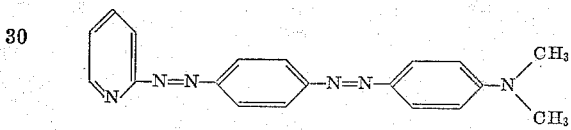

0.51 part of 2-p-aminophenylazopyridine is dissolved in 30 parts of water containing 0.27 part of hydrochloric acid and cooled to 0.5° C. 0.24 part of sodium nitrite dissovled in 3 parts of water is added and the mixture is stirred until diazotization is complete.

0.31 part of dimethylaniline is dispersed in 30 parts of water containing 1.3 parts of trisodium phosphate and iced to 15° C. The diazo solution is added and the resulting mixture stirred without temperature control until coupling is complete. The precipitated product is isolated by filtration and purified by recrystallization from cyclohexane.

By using an equivalent amount of the following coupling components in place of the dimethylaniline in this example, corresponding diazo dyes are obtained:

Cresidine
1 and 2-naphthylamine
Diphenylamine
N-methyldiphenylamine
2,5-dimethoxyaniline
2,5-diethoxyaniline
m-toluylenediamine
1,5-diaminonaphthylene
m-methyldimethylaniline
4-methoxy-m-phenylenediamine
4-chloro-m-phenylenediamine
N',N'-dimethyl-m-phenylenediamine
2,6-diaminopyridine
6-methoxy-2-naphthylamine
2,5-xylidine

*Example 21*

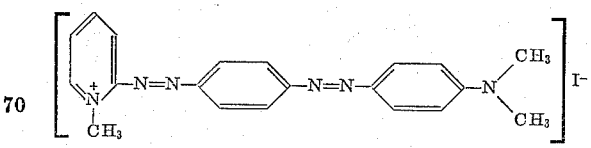

A stirred solution of 0.39 part of the product of Example 20 and 5 parts of methyl iodide in 20 parts of benzene is heated at gentle reflux until quaternization is complete. The precipitated dyestuff is filtered from the cooled reaction mixture and purified by recrystallization from absolute alcohol. This dyestuff dyes polyacrylonitrile fibers deep blue with excellent fastness properties.

Similarly, the other products of Example 20 can also be quaternized with methyl iodide, diethyl sulfate, phenacyl bromide and other quaternizing agents.

*Example 22*

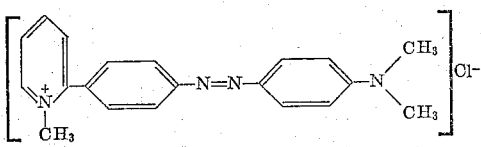

16.3 parts of 2-(4-aminophenyl)pyridine is dissolved in 500 parts of water containing 10.9 parts of hydrochloric acid and cooled externally to 5° C. Seven parts sodium nitrite dissolved in 70 parts water are added and the mixture is stirred 10 minutes until diazotization is complete.

Fourteen and one-tenth parts of N,N-dimethylaniline is dissolved in 1000 parts water containing 4 parts hydrochloric acid and iced to 10° C. The diazo solution is added and the solution is adjusted to a negative test on Congo red indicator paper with aqueous 20% sodium acetate solution. The dyestuff precipitates and is filtered. The wet press cake is dissolved in 500 parts of water by heating. It is cooled and sufficient sodium chloride is added to precipitate the crystalline dyestuff, which is filtered, washed with brine and dried.

The product is quaternized by the procedure of Example 21. It dyes acrylic fibers bright red.

*Example 23*

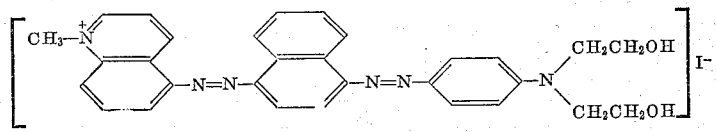

The procedure of Examples 20 and 21 are followed using the product of Example 1 as the amine in equivalent amounts to the p-aminophenylazopyridine and N-phenyldiethanolamine as the coupling component. The product is isolated as the iodide.

We claim:
1. As a dyestuff a 1-methyl-4-(2,6-diamino-3-pyridylazo)-pyridinium salt.
2. A process of forming an azo dye by condensing an amino pyridine with a p-aminophenyl nitroso compound which comprises: under anaerobic condition heating said components in a non-polar organic solvent in the presence of potassium hydroxide; during said heating period azeotropically distilling water as formed during reaction; and continuing said heating and azeotropic distillation until reaction substantially ceases.
3. A process according to claim 2 in which the non-polar solvent is xylene.

References Cited in the file of this patent
UNITED STATES PATENTS
2,864,813    Bossard et al. _____ Dec. 16, 1958

UNITED STATES PATENT OFFICE
CERTIFICATE OF CORRECTION

Patent No. 3,151,106                                      September 29, 1964

Sien Moo Tsang et al.

It is hereby certified that error appears in the above numbered patent requiring correction and that the said Letters Patent should read as corrected below.

Column 8, lines 19 to 24, the formula should appear as shown below instead of as in the patent:

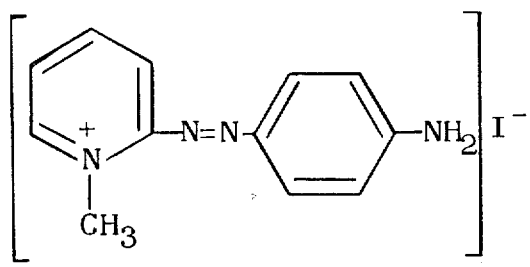

column 16, line 27, for "condition" read -- conditions --.

Signed and sealed this 9th day of February 1965.

(SEAL)
Attest:

ERNEST W. SWIDER                                   EDWARD J. BRENNER
Attesting Officer                                     Commissioner of Patents